Patented May 7, 1946

2,399,697

UNITED STATES PATENT OFFICE 2,399,697

DRYING OILS AND METHOD FOR THE PREPARATION THEREOF

Fred J. Stark and George H. Slack, Peoria, Ill., assignors to Fred J. Stark, George H. Slack, R. M. Rutledge and Harry A. Hirst, as trustees No Drawing. Application August 30, 1941, Serial No. 409,016

8 Claims. (Cl. 260—406)

The present invention relates to new and improved drying oils and more particularly to a new and improved process for increasing the drying properties of non-drying, weak or semi-drying oils, including, for example, such oils as soy bean oil, corn oil, cottonseed oil and other similar vegetable oils.

One of the objects of the invention is to provide new and improved products which will dry on exposure to the air, with little or no driers being added, to form protective films or coatings.

Another object of the invention is to provide new and improved drying oils which are useful in the manufacture of paints, varnishes and other protective coatings.

Still another object of the invention is to produce a new and useful soy bean drying oil.

An additional object of the invention is to provide new and improved drying oils which are especially adapted for outside usage.

Another object of the invention is to provide new and improved drying oils which do not tend to discolor or become yellow with age.

Still another object of the invention is to provide new and improved drying oils which, when incorporated into paints, can be applied to wet or greasy surfaces without danger of blistering, peeling or cracking.

Another object of the invention is to provide a new and improved method for producing products of the character above described. Other objects will appear hereinafter.

These objects are accomplished in accordance with this invention by subjecting oils having non-drying, weak or semi-drying properties, as, for example, soy bean oil, corn oil or cottonseed oil, to halogenation followed by oxidation. The treatment is especially applicable to soy bean oil, and the products obtained are characterized by many new and improved properties not heretofore available in the starting materials.

In practicing the invention it is preferable to effect the first step of the process with nascent chlorine, with or without a catalyst and with or without the application of pressure, preferably under super-atmospheric pressures. In the second step of the process it is preferable to subject the reaction product obtained in the first step of the process to treatment with nascent oxygen. The nascent chlorine may be supplied by means of a chlorinating agent which decomposes gradually under the temperature and pressure conditions used in order to liberate free chlorine. The chlorinating agent which has been found to be especially suitable for the purpose of the present invention is silicon tetrachloride. The nascent oxygen may be supplied by an oxidizing agent which decomposes gradually to liberate free oxygen, and for this purpose excellent results have been obtained in accordance with the invention by employing benzoyl peroxide.

The invention will be illustrated, but is not limited, by the following example in which the quantities are stated in parts by weight unless otherwise indicated:

Example

Twenty (20) gallons of soy bean oil (alkali refined) were measured into a vessel with an outside source of heat and a mechanical stirrer. Then five (5) ounces of silicon tetrachloride were added. The vessel was closed and the mixture was subjected to an added pressure of 30 to 75 pounds gauge of carbon dioxide and was heated to a temperature of 100° C. for six hours with constant stirring.

The pressure on the vessel was then released, resulting in the expulsion of a considerable amount of hydrogen chloride, and the temperature was allowed to fall to about 50° C. One (1) pound of benzoyl peroxide was added and the vessel was again closed and heated to a temperature of 150° C. for six hours. During this heating stage the pressure automatically rises due to the autogenous pressure in the vessel. The pressure will ordinarily rise to about 30 to 40 pounds gauge, although in some cases it has gone as high as 85 pounds.

After the second heating stage the vessel was opened and the reaction product was neutralized by blowing air therethrough for about an hour in order to remove hydrogen chloride and other gases present. The reaction product was then filtered in any suitable type of vessel in order to remove mucilaginous and other by-products. The filtrate is a clear oil, differing from the original starting material in a number of ways, as follows: In the first place, it dries much more readily. Secondly, it forms clear, transparent, substantially permanent protective films on surfaces, whereas the original oil has practically no film-forming properties of a permanent nature. Thirdly, its wetting properties, in so far as the wetting of a pigment is concerned, appear to be substantially decreased as compared with the original untreated oil. Fourthly, it is very difficult to emulsify. Fifthly, paints made from this oil can be applied to wet or greasy surfaces without danger of blistering, peeling or cracking.

The oil produced in accordance with the foregoing example may be used to replace linseed oil or other drying oils in all of the well known paint formulas and varnish formulas. A typical varnish made with this oil may be compounded as follows:

| | Per cent |
|---|---|
| Soy bean drying oil of the above example | 30 |
| Maleic resin (Resinous Products Company) | 30 |
| Thinner (naphtha, turpentine or hydrogenated petroleum) | 40 |

The maleic resin is melted by heating it to a temperature of about 150° to 160° C. The soy bean drying oil is added and the mixture is cooked for several hours within the range from about 150° to about 200° C. Thereafter the thinner is added and the varnish is ready for use.

A typical paint made with the soy bean drying oil of the above example may be compounded as follows:

| | | |
|---|---|---|
| Lead carbonate | pounds | 175 |
| Zinc oxide | do | 100 |
| Titanium dioxide | do | 15 |
| Asbestine (a product of Johns Manville Company) | pounds | 30 |
| Mica | do | 5 |
| Soy bean drying oil of the above example | gallons | 19 |
| Soy bean drying oil varnish made as described above | gallons | 5 |
| Lead, cobalt and manganese driers of a type well known in the paint trade | ounces | 96 |

The Asbestine is aluminum silicate.

This will make approximately 30 gallons of an excellent outside paint which does not tend to darken or turn yellow with age.

It will be understood that the foregoing example of the method of making a new and improved drying oil in accordance with this invention is merely illustrative and that variations and modifications may be made without departing from the invention. The same is true with respect to the typical varnish formula and the typical paint formula.

Although silicon tetrachloride has given especially desirable results, it will be understood that the invention is not limited to this particular compound. The halogenating agent used is preferably one which is a liquid itself and which is miscible or soluble in the vegetable oil used as a starting material. Silicon tetrachloride fulfills these requirements. Titanium tetrachloride may also be used but tends to have a discoloring action. Chlorine gas or liquid chlorine may be used but is much more difficult to employ because of the necessity of injecting it into the reaction vessel. In carrying out the halogenation the use of chlorine compounds is preferred because of their more ready availability, but it will be understood that other halogen compounds having similar characteristics, such, for example, as bromine compounds, may also be employed.

It will be observed from the example that the amount of the chlorinating agent required is relatively small; namely, 5 ounces to 20 gallons where silicon tetrachloride is used. Silicon tetrachloride contains approximately 85% of available chlorine. The amount of halogenating agent employed may vary somewhat with different halogenating agents. In the example given the amount of the silicon tetrachloride is between 0.1% and 0.2%. Larger amounts may be used, say up to 5%, and somewhat smaller amounts may be used, although it appears that excess amounts have no special effect.

The temperature during the halogenation step may vary rather widely but is preferably within the range from room temperature to 100° C. Likewise the time of heating in the first step may vary rather widely, but is preferably within the range of about 4 hours to about 6 hours.

The pressure during the halogenation step may vary rather widely but is preferably within the range of about 25 pounds to about 75 pounds per square inch above the atmospheric pressure, and pressures as high as 200 pounds and higher have been employed.

As previously indicated, the maintenance of a superatmospheric pressure in the halogenation step is accomplished by means of an atmosphere of an inert gas such as carbon dioxide. Other inert gases may be used which do not react with the halogen, as, for example, nitrogen, but halogen reactive gases such as hydrogen are to be avoided for reasons which will be apparent.

In carrying out the halogenation step a catalyst may also be employed, as, for example, a nickel catalyst. An illustration of a suitable catalyst which has been used in accordance with the invention is nickel formate. The use of a catalyst accelerates the reaction, particularly when operating under atmospheric pressures. Good results are obtained, however, under super-atmospheric pressures without a catalyst. It might be mentioned that the reaction described in the example was carried out in an iron kettle, which may or may not have some catalytic effect.

In the second or oxidation step various types of oxidizing agents may be employed. Benzoyl peroxide is preferred because it has the property of decomposing to liberate free oxygen at temperatures within the range of 100° to 150° C. Other oxidizing agents which may be mentioned are sodium perborate, potassium permanganate and barium peroxide. Care should be taken not to use oxidizing agents containing water. The second step is preferably carried out under substantially anhydrous conditions because it has been found that the presence of substantial quantities of moisture causes an explosion hazard.

The temperature employed in the second step of the reaction may vary within relatively wide limits depending upon the particular oxidizing agent employed, and is preferably within a range of about 50° to 150° C. The minimum temperature is preferably sufficiently low to prevent the spontaneous decomposition of the oxidizing agent, for example, benzoyl peroxide, and the temperature is then preferably raised gradually until it is within the range of from 100° to 150° C. However, the temperature may be much higher but the upper limit should be such that there is no substantial amount of charring.

The pressure in the second stage may vary within relatively wide limits. Generally speaking no attempt is made to apply an independent pressure during this stage because a substantial pressure is generated by the reaction.

The time of the oxidation may vary depending upon the quantity and type of material, as well as other factors, but usually about 4 to 6 hours will be sufficient under the conditions described in the foregoing example. The oxidation has been carried out for as long as 24 hours without any substantial change in the result.

The amount of the oxidizing agent may be varied rather widely. As will be apparent by reference to the example, only a minor proportion of the oxidizing agent is necessary. Good results have been obtained with less than 1% based on the weight of the oil. In the practice of the invention the use of about 0.3% to about 0.7%, which corresponds to about one-half pound to 1 pound of benzoyl peroxide to 20 gallons of soy bean oil, has been found to be effective. Larger quantities may be used.

The neutralization of the reaction product, as previously indicated, is preferably accomplished by blowing dry air therethrough in order to remove hydrogen chloride and other gases present. The product may also be neutralized by adding alkaline substances such as soda ash or the like. The resultant product has very little odor and in physical appearance somewhat resembles the original untreated oil, although there is a small increase in viscosity. The iodine number of the soy bean product is usually within the range of about 130 to 135, which is about the same iodine number as the original alkali refined soy bean oil. However, the product has many other characteristics previously indicated in the example which cause it to differ markedly from the original soy bean oil. One of the very pronounced properties of the product, as compared with the original oil, is a very substantial increase in its cohesive and adhesive properties. In separating the desired product from the residue of mucilaginous and other substances which form during the reaction, it is usually desirable to add a filtering medium, as, for example, Filter-Cel (Johns-Manville).

The invention is not limited to the treatment of soy bean oil but can also be used in treating other vegetable oils such as corn oil, cottonseed oil, etc. However, the results obtained with soy bean oil have been found particularly advantageous. The soy bean oil employed may be either crude soy bean oil or refined soy bean oil, but the latter is preferable because the products obtained from the crude oil are darker in color and there are more by-products. All of the drying oil products produced in accordance with the invention, as well as the starting materials therefor, are unsaturated. It might be mentioned that the mucilaginous by-products obtained as a residue from the filtration are valuable as fuel oils.

Drying oils made in accordance with the invention form excellent protective coatings and may be used in all types of industrial paints and varnishes, particularly in outside paints, interior gloss paints, flat coating paints, semi-gloss paints and industrial paints. Coating compositions made in accordance with the invention have been employed successfully in painting slaughter houses, creameries, breweries and other structures where the ordinary type of paint is entirely unsatisfactory. One feature of paints or other protective coatings prepared in accordance with this invention is that they may be applied in the presence of moisture and dry to a satisfactory protective film without blistering, peeling or cracking. The wall or other structure to be painted may be sprayed with water in advance of the application of a paint made up with a drying oil of the type herein described.

The exact chemical nature of the process involved and the chemical structure of the products are not known at the present time, but inasmuch as hydrogen chloride is formed by the type of chlorination illustrated in the example, it is apparent that there is some displacement of hydrogen from the original oil molecule. The invention, however, is not limited as to any theory in so far as the nature of the reaction is concerned.

Having thus described the invention, what we claim as new and desire to secure by Letters Patent of the United States is:

1. A method of producing a drying oil which comprises chlorinating a soy bean oil by the action of nascent chlorine and then subjecting the reaction product to the action of nascent oxygen.

2. A method of producing a new and improved drying oil which comprises chlorinating a soy bean oil with silicon tetrachloride and then treating the resultant reaction product with an oxidizing agent which decomposes to liberate nascent oxygen.

3. A method of producing a new and improved drying oil from soy bean oil which comprises chlorinating the soy bean oil with a chlorinating agent miscible therewith and which decomposes to liberate nascent lime at temperatures within the range from about 20° to 100° C., for a period of about 4 to 6 hours under a super-atmospheric pressure of an inert gas, releasing the pressure, adding to the reaction mixture an oxidizing agent of the type which decomposes to liberate nascent oxygen under substantially anhydrous conditions, heating the reaction mixture to a temperature within the range from about 100° to 150° C. for about 4 to 6 hours, then neutralizing and filtering the reaction product and removing the filtrate.

4. A method of preparing a new and improved drying oil which comprises treating soy bean oil with about 0.2% of silicon tetrachloride at a temperature within the range from about 20° to about 100° C. for a period from about 4 to 6 hours under a super-atmospheric pressure of carbon dioxide from about 25 pounds to about 75 pounds per square inch, releasing the pressure and allowing the temperature to fall to around 50° C., then adding from about 0.3% to about 0.7% of benzoyl peroxide and heating to a temperature above about 100° C. but below the temperature at which substantial charring occurs for a period of about 4 to 6 hours under the autogenous pressure of the reaction mixture.

5. A method of producing improved drying oils which comprises chlorinating an unsaturated vegetable oil with nascent chlorine, and thereafter treating said chlorinated oil with nascent oxygen.

6. A method of producing new and improved drying oils from soy bean oil which comprises chlorinating a soy bean oil with nascent chlorine, thereafter treating the chlorinated oil with nascent oxygen, and separating the liquid phase portion of the product, the resultant oil being characterized by the fact that it dries more readily than the raw or refined soy bean oils, forms clear transparent substantially permanent films, and may be incorporated into paints which can be applied to wet or greasy surfaces without blistering, peeling or cracking, and which do not tend to yellow with age.

7. A method of producing a new and improved drying oil which comprises chlorinating an unsaturated vegetable oil with silicon tetrachloride and then treating the resultant reaction product with nascent oxygen.

8. A method of producing a new and improved drying oil which comprises chlorinating a soy bean oil with silicon tetrachloride and then treating the resultant reaction product with benzoyl peroxide.

FRED J. STARK.
GEORGE H. SLACK.

Certificate of Correction

Patent No. 2,399,697.

May 7, 1946.

FRED J. STARK ET AL.

It is hereby certified that error appears in the printed specification of the above numbered patent requiring correction as follows: Page 3, second column, line 19, for "lime" read *chlorine*; and that the said Letters Patent should be read with this correction therein that the same may conform to the record of the case in the Patent Office.

Signed and sealed this 1st day of April, A. D. 1947.

[SEAL]

LESLIE FRAZER.
*First Assistant Commissioner of Patents.*